United States Patent [19]

Marchner et al.

[11] 4,160,868
[45] Jul. 10, 1979

[54] APPARATUS AND METHOD FOR MELTING FERROUS PELLETS

[75] Inventors: Jan Marchner; Yngve Sundberg, both of Vesteras, Sweden

[73] Assignee: ASEA Aktiebolag, Vësterås, Sweden

[21] Appl. No.: 744,424

[22] Filed: Nov. 23, 1976

[30] Foreign Application Priority Data

Nov. 28, 1975 [SE] Sweden ................................ 7513411

[51] Int. Cl.² .............................................. H05B 7/18
[52] U.S. Cl. .......................................... 13/11; 13/26; 13/33
[58] Field of Search ..................... 266/234; 13/2, 4, 9, 13/11, 33, 26, 27

[56] References Cited

U.S. PATENT DOCUMENTS

| 2,256,518 | 9/1941 | Dreyfus | 13/4 |
| 3,709,476 | 1/1973 | Hammarlund et al. | 266/234 |
| 3,988,525 | 10/1976 | Stenkvist | 13/33 X |

FOREIGN PATENT DOCUMENTS

| 1960327 | 12/1969 | Fed. Rep. of Germany | 266/234 |
| 395394 | 4/1972 | U.S.S.R. | 266/234 |

Primary Examiner—R. N. Envall, Jr.
Attorney, Agent, or Firm—Kenyon & Kenyon

[57] ABSTRACT

Ferrous pellets are melted by feeding them to a ferrous melt in the hearth of an electric arc furnace having a centrally positioned arc. The melt is inductively stirred so that the lower portion of the melt flows radially outwardly while its upper portion flows radially inwardly towards the arc so that the pellets and possibly slag are carried towards the arc.

3 Claims, 3 Drawing Figures

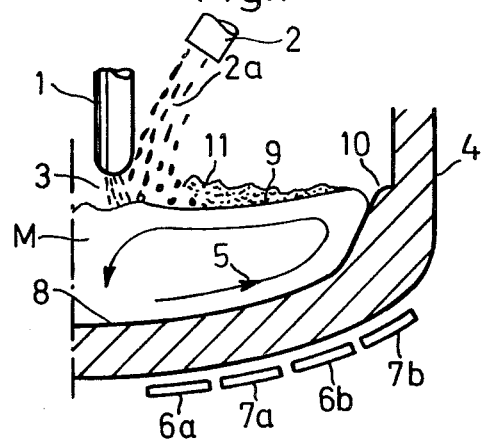
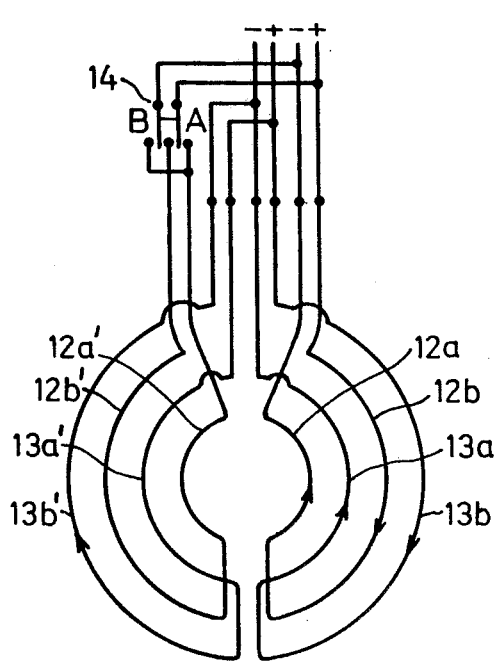
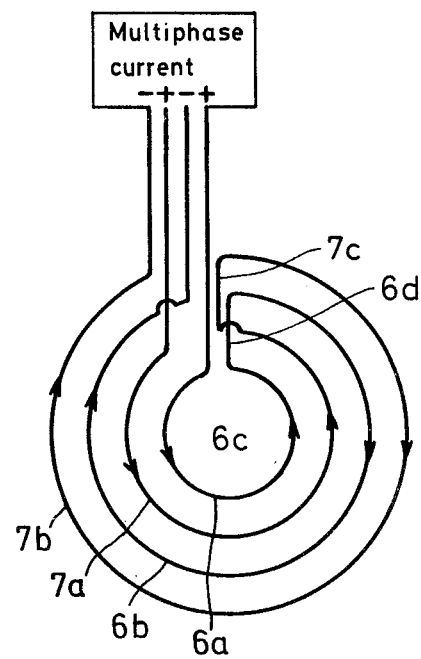

APPARATUS AND METHOD FOR MELTING FERROUS PELLETS

BACKGROUND OF THE INVENTION

Iron sponge containing prereduced iron ore is pelletized into pellets which are melted by the pellets being fed to an iron melt in the hearth of an electric arc furnace conventionally constructed with the typical cylindrical shape and having one or more centrally psoitioned arcing electrodes. The arc or arcs formed between the electrodes and the melt may be powered by either AC or DC.

The pellets, fed through one or more feeders in the furnace roof, sometimes fall on the melt at positions remote from the arc or arcs even though aimed at the latter. When this happens, the pellets floating on the melt tend to form a crust and to become oxidized, or in effect reoxidized, which interferes with the desired rapid melting of the pellets. Usually there is a slag layer floating on the melt. The arc or arcs drive this slag radially outwardly to expose the melt centrally within the furnace, which is desirable because it permits the pellets to fall on clean molten metal if the pellets go where they are aimed. This action of the arc or arcs has the undesirable effect of not only driving away the slag, but also the pellets, not only resulting in the problem of the crust formation and oxidation or reoxidation of the pellets, but also having the undesirable effect of producing a thickened slag layer at the furnace's slag line and thus increasing the normal attack of the slag on the furnace wall lining.

In addition to these troubles, the slag layer is thinned centrally around the arc or arcs, thus exposing the furnace wall lining to direct radiation from the arc or arcs, to an undesirable degree.

Electric arc furnaces have been provided with electric inductive stirrers positioned below the bottom of the hearth, the hearth being made with a non-magnetic construction. Such a stirrer is in the form of a flat coil or coils which can be powered with multiphase AC to inductively stir the melt in the hearth. Such stirrers have been ineffective insofar as any correction of the above described troubles is concerned.

SUMMARY OF THE INVENTION

According to the present invention, for the melting of the pellets, and also other relatively small ferrous pieces having the physical characteristics of the pellets, an electric arc furnace is provided having the usual hearth with its upstanding periphery containing the ferrous melt, and at least one arcing electrode positioned to form the arc with the melt above the central portion of the hearth and melt. Also, an electric induction stirrer is used, the hearth being non-magnetic.

However, contrasting with the prior art stirrers heretofore used, the stirrer of the present invention is constructed to inductively stir the melt so that its lower and upper portions flow radially respectively in opposite directions between the central portion of the melt and hearth and the upstanding periphery of the hearth. This new stirrer comprises at least two substantially concentric radially inner and outer conductor coils positioned beneath the hearth substantially parallel therewith and substantially symmetrically with respect to the central portion where the arcing occurs. The two coils are provided with an AC power means for feeding them with multiphase current having a phase sequence inductively causing the described stirring. The traveling field in one coil is made opposite to that of the other coil, thus providing the described new stirring. The traveling fields are made reversible with respect to each other.

Normally the stirring direction is such that it is the upper melt portion and the melt surface that is inductively fed radially inwardly from the hearth's upstanding periphery to the arcing location. The inwardly flowing melt then moves everything on its surface, pellets and slag, towards the arcing location, the pellets being rapidly melted by the heat of the arc or arcs and/or by reaching the clean melt at the central portion of the furnace. The slag annularly piles up around the arcing location so as to provide an arc radiation shield reducing the radiation to the furnace lining. At the same time the slag layer at the slag line of the furnace wall lining is reduced in thickness with a consequent reduction in the slag's attack on the furnace lining at the slag line.

BRIEF DESCRIPTION OF THE DRAWINGS

Specific examples of the present invention are schematically illustrated by the accompanying drawings in which:

FIG. 1 is a cross section of one half of an electric arc furnace, showing only the parts required for an understanding of this invention;

FIG. 2 diagrammatically shows a first example of the new stirrer; and

FIG. 3 is a corresponding manner shows a second example.

DETAILED DESCRIPTION OF THE INVENTION

Having reference to the above drawings, FIG. 1 shows the arcing electrode 1 and a pellet feeder 2 feeding the ferrous pellets 2a in the form of pelletized iron sponge containing prereduced iron ore, to the arc 3 insofar as this is possible. The ferrous melt M heated by the arc 3 is contained by the nonmagnetic hearth 8 having the upstanding periphery 10 from which the furnace wall lining 4 extends upwardly. The surface of the melt M is shown at 9 with a layer of slag 11 floating on this surface. The hearth 9 is of non-magnetic construction.

As usual, the furnace is of generally cylindrical construction with the arcing electrode 1 centrally positioned. More than one electrode may be used to form more of the arcs 3 but all of the arcs are substantially centrally positioned in the furnace. The arcing power may be either AC or DC.

The melt M is stirred as indicated by the arrow 5, in this case the direction being radially outwardly from the central portion throughout the lower portion of the melt, and radially inwardly throughout the melt's upper portion and surface 9. Possible displaced pellets are therefore fed to the arc 3 and the naked metal there, while the slag 11 forms an annular pile or thickened layer surrounding the arc, thereby becoming thinned at the periphery 10 of the hearth which by its junction with the furnace wall 4 forms the normal slag line. As illustrated by FIG. 1, not only the slag, but the melt itself is dragged away from the slag line by the stirring action of the present invention.

If the direction of the flow indicated by the arrow 5 is reversed, the slag 11 is carried towards the periphery of the hearth to facilitate deslagging through the usual slag tap hole (not illustrated).

FIG. 1 shows an inner coil or pair 6a and 7a, and an outer coil or pair 6b and 7b. These coils may be made as a flat assembly following the contour of the hearth bottom and in that sense parallel to the bottom.

The general overall coil contour is indicated by FIG. 3 which shows the example used in FIG. 1. The coils are radially interspaced and are concentric with each other, and they are symmetrically arranged with respect to the central portion of the furnace, or in other words, with respect to the electrode 1 and its arc 3. In FIG. 3 the coils are shown as being powered from a multiphase current source providing the coils with the oppositely rotating fields indicated by the arrows in FIG. 3, due to their series arrangement. As shown, the coil 6a is in series connection with the coil 6b, and the coil 7a is in series connection with the coil 7b. Therefore, the electric fields of the coils 6a and 7a are in the same direction while being in the opposite direction as to the coils 6b and 7b.

In operation, under normal conditions, the coils 6a and 7a through their induced currents in the melt propel the lower portion of the melt radially outwardly while the coils 6b and 7b apply a propulsion force in the opposite direction, the result being that the radially outward flow of melt at the circumferential position established by the coil pair 6b and 7b, is caused to reverse, the result being that the flow loops upwardly and back on itself and flows annularly throughout the upper portion of the melt and its surface 9 to the central portion where the arc or arcs 3 are operating. The innermost one of the coils has a central or center area 6c encircled by the coil pair 6a and 7a and which is free from any conductors. In other words, the area directly below the arc or arcs 3, or in other words, the central portion of the melt, is substantially free from induced currents. Therefore, as the upper portion of the melt flows radially towards its central portion, the flow at that location inherently descends to join the lower portion which is being driven radially outwardly by the coils 6a and 7a. The traveling electric multiphase currents applied to the coils 6a and 7a and 6b and 7b may be applied in the conventional manner used to induce traveling currents in the melt.

FIG. 2 serves to show that the coils 6a and 8a of FIG. 3 can be provided by a pair of half coils shown at 12a and 13a and 12a' and 13a' in FIG. 2. The outer coil pair 6b and 7b of FIG. 2 are replaced by the outer half coils 12b and 13b and 12b' and 13b' in FIG. 2.

The series connections of the coils are effected by the respective coils being interconnected in the form of flat loops. In the case of FIG. 3, the coils 6a and 6b are connected in series by the radially extending connector 6d, while the coils 7a and 7b are interconnected by the radially extending conductor 7c. In this way the traveling fields of the coils 6a and 7a are in the same direction while the corresponding fields for the coils 6b and 7b are in the opposite direction.

The same arrangement is used in the case of FIG. 2 excepting that in addition the half coils 12a' and 12b' are provided with a phase reversal switch 14. When this switch is in the position shown at A, the described type of stirring indicated at 5 in FIG. 1 is obtained. When the switch is in position B, the traveling direction of the field in the coils 12a' and 12b' is reversed so that the flow direction indicated at 5 in FIG. 1 is reversed, causing the slag 11 to be carried towards the periphery of the hearth to facilitate deslagging.

As a review of the stirring action, the coils 6a and 7a or their equivalent half coils in FIG. 2 serve to drive the melt, radially outwardly from the location of the arc or arcs, throughout the lower portion of the melt, while the reverse action coils 6b and 7b, or their equivalent half coils in FIG. 2, provide a reverse drive causing the melt to bend or loop upwardly to the upper portion of the melt and its surface, with the result that the flow is then radially inwardly to achieve the objective of the present invention.

FIG. 2 serves to show both that the inner and outer concentric coils of this invention may be made as half coils, and that by the reverse connection switch it is possible to reverse the melt flow.

What is claimed is:

1. An arc furnace for melting ferrous pellets which float on a ferrous melt, said furnace comprising a nonmagnetic hearth for containing said melt, at least one arcing electrode positioned to form an arc on a central portion of said melt, feeding means for feeding said pellets substantially to said central portion, stirrer means formed by at least two substantially concentric radially inner and outer coils positioned adjacently below said hearth and substantially parallel therewith and substantially symmetrical with said central portion, and power means for feeding said coils with multiphase current having a phase sequence inductively propelling the bottom portion of said melt radially outwardly from below said central portion so that the upper portion of the melt is caused to flow radially towards said central portion and float towards said central portion any of said pellets inadvertently floating on the melt remotely from the central portion thereof.

2. The furnace of claim 1 in which said power means is for optionally reversibly feeding said coils with said current.

3. The furnace of claim 1 in which said coils are formed by half coils which are connected in series.

* * * * *